United States Patent [19]
Warmont

[11] 3,892,023
[45] July 1, 1975

[54] PROCESS OF MANUFACTURING A CAPACITOR ASSEMBLY

[75] Inventor: Georges Warmont, Monceau sur Sambre, Belgium

[73] Assignee: Ateliers de Constructions Electriques de Charlerol, (ACEC), Charlerol, Belgium

[22] Filed: Apr. 20, 1973

[21] Appl. No.: 353,123

[30] Foreign Application Priority Data
Apr. 21, 1972 Belgium .................................. 3965

[52] U.S. Cl. ............................. 29/25.42; 317/260
[51] Int. Cl. ............................................ H01g 13/06
[58] Field of Search ................... 317/260; 29/25.42

[56] References Cited
UNITED STATES PATENTS
1,511,935 10/1924 Bayles ............................. 317/260
2,119,113 5/1938 Olving ............................. 317/260
3,302,082 1/1967 Preissinger ..................... 317/260
3,365,632 1/1968 Grahame ........................ 317/260

Primary Examiner—E. A. Goldberg
Attorney, Agent, or Firm—Bacon & Thomas

[57] ABSTRACT

The disclosure relates to a process for manufacturing an assembly made up of any number of circular capacitors which are directly interconnected one to another while manufacturing is in progress, and the assembly thereof. A first capacitor is provided with the adjacent plates thereof having their edges extending one beyond another. An insulating layer is wound around the first capacitor and a second capacitor is set on the layer. And so on until the wanted number of capacitors is reached. On one side of the assembly, a mask is pushed into a recess provided at the edge of each insulating layer thereof. Both sides of the assembly are then metallized. The masks are removed leaving the required insulation between the various capacitors.

1 Claim, 1 Drawing Figure

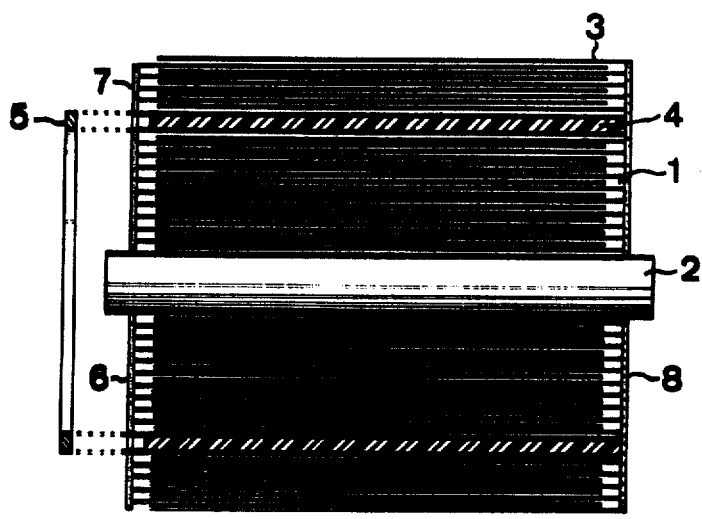

PROCESS OF MANUFACTURING A CAPACITOR ASSEMBLY

The instant invention relates to the manufacturing of an assembly of any number of capacitors the various components of which are connected one to another while manufacturing is in progress. The process substantially simplifies the connection of the terminals thereof to an utility circuit.

According to the invention, the process of manufacturing the assembly is characterized in that a first capacitor coil is provided the adjacent plates of which have their edges extending beyond one another along the coil axis so that the edges are protruding when viewed from their respective side of the coil, that an insulating material is wound around the first coil, on which a second capacitor similar to the first capacitor is set. And so on until the wanted number of capacitors is reached. On one side of the assembly a mask is provided for concealing the edges of the insulating material which separates each pair of capacitors. To connect electrically all the turns of the coil, both sides of the assembly are metallized by metal spraying, or by any other suitable process susceptible to achieve the interconnection of the plates. Finally, all the masks are removed leaving, on one side, electrically insulated, all the capacitors. The latter are, on the other hand, electrically connected with one another by the metallization of the opposed side.

In accordance with one particular embodiment of the instant process, the insulating material between the various capacitors is slightly set back from the sides of the coil and the masks are made up of rings which are pushed into the recess thereby provided.

Another embodiment of the process in accordance with the instant invention consists on using a mandrel so designed as to allow the metallized portion to be removed easily. This mandrel is set around a first capacitor and a second capacitor is wound thereon.

The instant invention will better be understood by the hereinafter description of the accompanying drawing which shows an assembly of capacitors obtained by the process in accordance with the invention.

On the drawing there is depicted an assembly accordance two capacitors made up of a first capacitor 1 wound around a mandrel 2 and a second capacitor 3 coiled on the first capacitor and between which is provided a spacing filled with an insulating material 4. For sake of clarity, the spacing between adjacent plates of the capacitors has been greatly exaggerated and without the dielectric material therebetween. These plates are constituted, for example, af a very thin deposit of zinc or aluminum, by means of evaporation under vacuum, on a plastic film such as polypropylene. The process in accordnace with the invention is also effective for metallized paper capacitors and for paper capacitors with extending plates.

The insulating material 4 is slightly recessed on one side of the coil and into the recess, ring 5 made of any suitable material is pushed. Then, both sides of the assembly are metallized by spraying technique and, afterwords, the ring 5 is removed leaving an unmetallized spacing between the two capacitors. In this way, the plates of each of the capacitors are connected by means of the metal deposits 6 and 7, respectively, while the other set is electrically connected by means of the metal deposit 8 which constitutes a common connection for all the capacitors. To connect the assembly to terminals, one only needs to connect three wires, one to each of the metal deposits 6, 7 and 8, respectively.

Owing to the process described above, it is possible to construct a three-phase capacitor assembly which could be housed in a cylindrical casing which would contain less filling material, such as poured resin compared with a standard capacitor of the same capacity which is constituted by three coils housed in a parallelpiped casing. As a result, an economical device substantially reducted in weight is obtained.

It is to be understood that the process in accordance with the instant invention may be used to manufacture an assembly containing any number of capacitors, of the same or different capacitive values, in parallel or in series, housed in one casing.

I claim:

1. The method of manufacturing an assembly of a roll of wound capacitors, comprising the steps of:
   forming a first rolled capacitor with the electrodes offset axially to respectively project from opposite ends of the roll;
   placing a layer of insulating material around said first capacitor with at least one edge thereof spaced axially inwardly of the axial edges of the adjacent electrodes;
   wrapping at least a second capacitor around said insulation outwardly of said first capacitor in radial alignment therewith whereby said one edge of said insulation defines the bottom of a circular groove in an end face of said roll of capacitors and between said first and second capacitors;
   placing a masking ring in said groove;
   metallizing both axial end faces of said roll of capacitors to electrically connect the electrodes projecting from each end; and
   removing said masking ring and its overlying metallization whereby to electrically separate the electrodes at one end of said first and second capacitors.

* * * * *